Aug. 9, 1966  J. A. SIMPSON  3,264,759

READING-PACING DEVICE

Filed July 1, 1963  2 Sheets-Sheet 1

INVENTOR.
John A. Simpson
BY Stone, Nierman
Burmeister & Zummer
Attys.

Aug. 9, 1966  J. A. SIMPSON  3,264,759
READING-PACING DEVICE
Filed July 1, 1963  2 Sheets-Sheet 2
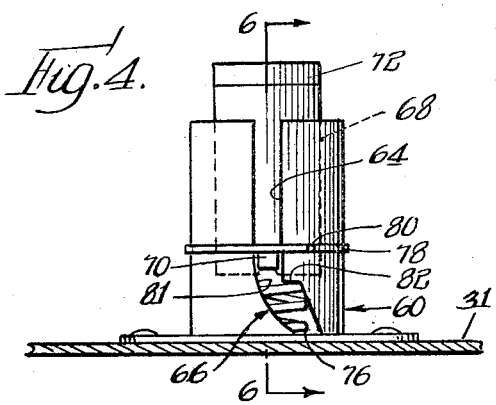
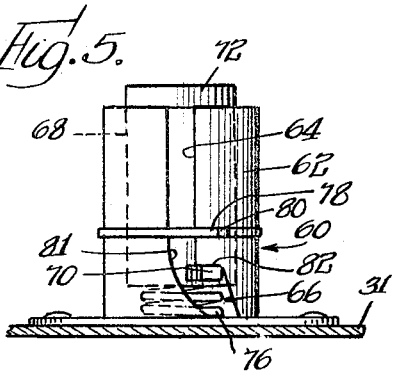
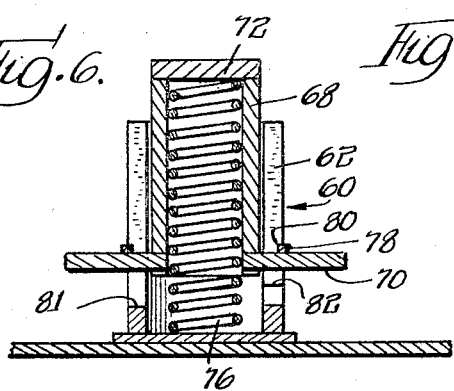
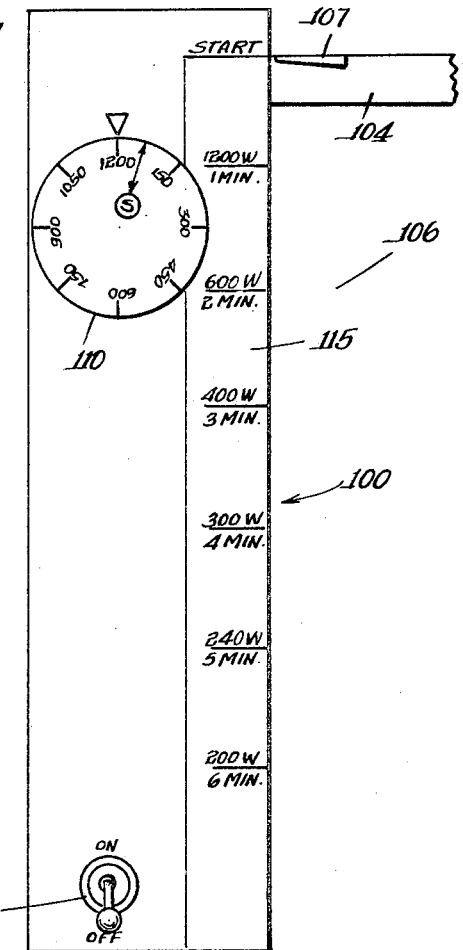
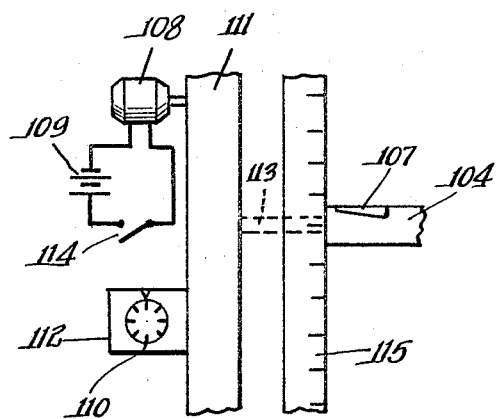
INVENTOR.
John A. Simpson
BY
Stone, Nierman, Burmeister & Zummer
attys

United States Patent Office 3,264,759
Patented August 9, 1966

3,264,759
READING-PACING DEVICE
John A. Simpson, Chicago, Ill., assignor to Elizabeth A. Simpson, Chicago, Ill.
Filed July 1, 1963, Ser. No. 291,887
6 Claims. (Cl. 35—35)

This invention relates to reading-teaching devices and more specifically to mechanisms of the type employed in the pacing of reading-speeds and to teaching or training sets including such mechanisms along with reading materials specifically designed for use therewith, particularly in self-testing on the speed of unpaced reading acquired by practice employing the pacing mechanism.

In the past decade or so, an important tool in the teaching of high-speed reading, not only in schools and reading clinics, etc., but also in industrial and similar installations, has been the reading-pacing device, of which a number of forms have from time to time been marketed. In these devices, practice or training is achieved by the use of a moving line-indicator which moves at predetermined constant speed fixed by setting of a knob or dial, the line-indicating member thus pacing the eye of the reader and, in the most preferable forms, covering a substantial portion of the written material just above the line instantaneously being indicated, this type of line indicator sometimes being called a "shutter"; other forms of line-indicating member in use, however, include such diverse structures as a mere wire extending over the page being read, an optical slit forming a light-bar projected from a distance on the page, or even a mere marginal pointer. Irrespective of the details of construction, the general teaching method employing such pacing mechanisms involves practice at gradually increased speeds, which essentially forces the abandonment of the habits (primarily habitual re-reading of lines, phrases, etc.) long since shown to be the most important impediment to high reading rates. However, as is also now well known, such practice must be combined with frequent testing of comprehension of the material, and must be advanced in speed at relatively small increments (a 10 or 15% speed advance) each time that a new level of proficiency is reached, in order that such a program or "course" achieve the desired end of increasing reading speeds by large factors without impairing comprehension.

In principle, some benefit may be obtained merely by using such a machine with ordinary reading materials and occasionally advancing the speed as a subjective judgment is reached that satisfactory comprehension is being obtained. However it has long since been demonstrated that use of such a machine in this manner produces little if any progress. Accordingly, such mechanisms are commonly marketed in reading-instruction sets with appropriate practice and test-reading materials, of preselected level of difficulty, etc., both for purposes of permitting standardization of reading rate with proper allowance for degree of difficulty of the material read and for permitting objective evaluation of comprehension by tests also incorporated in such sets. The importance of proper relation of pacing speed to unpaced level of accomplishment is such that an unpaced test is, in most scientifically designed programs, routinely taken before each practice session.

It is the objective of the practice with the machine, of course, to bring the reading rate to a high level in the absence of the machine, i.e. with the "forced speed" factor removed. Accordingly, frequent tests are administered without use of the machine, the test material being read in a normal manner. Mastery of the ability to read at the machine rate without use of the machine indicates the desirability of stepping up the machine rate by the 10 to 15% earlier mentioned, and a new rate is then set and practiced. In a complete set of materials for such purposes, there may be employed a variety of materials, both for the practice reading with the machine and for the tests administered without the machine. The level of difficulty of the materials used is, of course, in broad terms fairly uniform for any particular type of individual, such as a school child, on the one hand, or a college student or business executive, on the other hand. However, for any given class of person, there may be a variety of materials which are read at deliberately different speeds, because of differences in degree of comprehension which may be considered as acceptable; for example, a business executive, in using such a set of materials, normally has a double objective of learning fast scanning of materials of which only superficial comprehension is required, while also increasing the necessarily slower rate of reading of materials of which complete comprehension of both outline and detail is necessary. Since the techniques or habits which must be formed for varying degrees of comprehension are not necessarily identical for such diverse purposes (in some instances there may also be graduations between such extremes), practice with the various kinds of materials may involve different reading rates to achieve the "acceptable" comprehension level, and separate tests may be performed on these slightly different skills as progress in each is made.

It will be observed from the foregoing that the full and effective use of the machines requires that the tests performed on unpaced reading be timed since the use of the unpaced test as an accurate measuring instrument for accomplishment level is of the essence of any such a reading-practice set.

The necessity for accurate correlation between unpaced test speeds and line-indicator speed calibration just discussed has, prior to the present invention, constituted a serious block to the full realization of the potential widespread use of such sets for the achievement of high reading speeds. Heretofore, the equipment and materials used for these purposes have either been of the high-precision (and accordingly high-cost) type used in relatively small numbers in schools, colleges, industrial libraries, etc., or of the inexpensive, but inaccurate and accordingly inefficient, type which have been sold for home use; the cost of the highly accurate mechanisms heretofore believed required for really successful use of the entire reading-teaching method is prohibitive for the latter type of use, and indeed has in most cases limited school and institutional use largely to persons having a known "problem," although it has long been known that the benefits of such training are in no sense limited to persons whose reading is abnormally slow.

Prior to the present invention, the machines which were believed required for really effective results employed, in general, relatively expensive mechanisms in order to give the proper accuracy of calibration of the pacing device. Originally, synchronous motors were used in virtually all of the various commercial devices made for the purpose. More recently, for example as shown in U.S. Patent 2,919,500 of Simpson, Sinila and Soderquist, simpler forms of mechanisms, lower in cost, have been devised. In the mechanism of the patent mentioned, there are employed a constant force type of spring and a variable eddy-current brake. Although the cost of this type of device is substantially lower than those capable of comparable performance previously known, the cost differential as opposed to previous mechanisms has been somewhat reduced by the necessity of close tolerances in manufacture, or elaborate adjustment, required to produce the accurately calibrated shutter speeds at given settings of the speed control dial required for the reasons set forth above. Additionally, with such a mechanism, occasional recalibrations after long periods of heavy use (such as all-day use by successive persons over a period of months) have sometimes been required due to aging effects on the spring and on other portions of the mechanism.

The same type of precision employed in the construction of the pacing machine has heretofore been employed in timers designed for the administration of tests of reading rate in which the pacing machine is not used. In a common type of test, the test material is commenced simultaneously with the actuation of an interval timer, the material is read at a rate appropriate for comprehension, and the point reached upon the lapse of a fixed time (three minutes being typical) is recorded. The number of words read is then divided by the preset time to determine the rate per unit time. The proper setting of the machine for practice (advance by the usual increment, further practice at the previous practice rate, or even, under circumstances such as long gap in practice, retardation) is thus known. A similar test is, of course, used in preparation for commencement of a "course."

Prior to the present invention, various forms of timer have been used in such reading sets. Timers of high accuracy are in general objectionably expensive or subject to severe drawbacks for this use. A timer with an audible signal indicating the end of the fixed period is highly useful, but expensive. One type of timer heretofore in common use in this type of testing (predetermined time) is the familiar form of "hour glass" or sand-flow timer frequently sold as an "egg-timer." This timer has the serious objection of producing no signal other than visual upon expiration of the timing interval, so that the timing must either be done by someone other than the person undergoing the test or the results are necessarily distorted by the necessity for frequent observation of the timer.

The other general method of testing uses a fixed word count and the reading rate is determined by the time lapse required. Any ordinary clock or watch with a second-hand can theoretically be used for such timing, of course, but the inconvenience is substantial because of the practical necessity of recording "starting times," etc. The only satisfactory device heretofore known, meeting all of the requirements for completely proper self-administered testing of this type, is a timer of the stop-watch type, which is again a highly expensive accessory.

The factors of expense associated with the type of mechanical precision heretofore required for fully satisfactory results have seriously limited the use of the general method. The devices heretofore marketed for home and similar use have employed relatively crude and inexpensive respective mechanisms for the pacing practice and unpaced, but timed, testing, with consequent high error. One obvious form of such home device, for example, may use simple battery-driven motors for the pacing device and the timer, with the consequent error inherent in this type of device, where the speed-variation with battery aging is well known. Even neglecting manufacturing tolerances, it is possible to calibrate such a pacing device, and such a timer, only on a nominal or average basis. The holding of accuracy to error tolerances which are insubstantial as compared to the required accuracy of the measurement of the rate achieved and the slightly advanced rate of pacing thereafter set has not been sufficiently possible to make the method as practiced with such equipment comparable in efficiency to similar practice with the more expensive equipment.

The present invention stems from the recognition that the high costs heretofore thought to be required for precision mechanisms can be completely eliminated without any impairment whatever of the utility of the overall set of equipment, and indeed that the basic objectives can best be obtained with low-cost mechanisms by the further cost reduction flowing from the complete elimination of one of the mechanisms. In the device of the present invention, the timer which is used in the testing of reading rates when the pacing device is not being used is operated by the mechanism of the pacing device itself. Any error in the reading rate indicated in the measurement is counterbalanced by a reciprocal error in the reading rate for which the pacing device is set, so that the exact desired relation between the new practice rate fixed by the pacing device and the achievement level as measured by use of the timer is known with substantially complete accuracy despite discrepancies in actual calibration of both the timer and the pacing setting which would completely destroy the utility of the equipment were similar errors to exist only in the timing or the pacing mechanism.

The reciprocal or self-corrective nature of speed errors in a mechanism when used for pacing and timing, respectively, may be simply demonstrated algebraically, but may perhaps be understood by some even more simply by observations of an exemplary nature. Consider, for example, a single motive mechanism which performs, selectively, the function of a timer or of a drive for the line-indicator. In simplest concept, the mechanism itself runs at the same speed for both operations, the coupling to the line-indicator being variable for variation in a calibrated manner of the speed of that member, but the coupling to the timing indicator being fixed, so that the timing indicator, whether an audible signal at the end of an interval or a visual reading like a hand on a clock-like dial, is driven in the manner of a clockwork, albeit normally a highly inaccurate one. If the mechanism runs truly and accurately to its nominal designed speed, the calibration of the variable coupling is fully accurate as a representation of the exact speed of the line-indicator, and the timer is likewise fully accurate. Under these conditions, the use of the single mechanism is obviously fully equivalent to the use of the more elaborate separate precision mechanisms described earlier.

Consider now the case where the motive mechanism, due to tolerances in manufacture, wear, battery life or otherwise, is ten percent slower than its nominal design speed. In this case, the speed of the line-indicator will be ten percent lower than the indicated calibration values, and the actual elapsed time corresponding to any timer indication will be ten percent longer than indicated. Thus the falsity of the indicated progression rate of the line indicator (ten percent lower than indicated) is matched by the falsity of any indicated elapsed time (ten percent higher than indicated), so that the speed of the line-indicator (in words per minute) in paced reading remains in fully correct relation to the actual speed or unpaced reading as calculated (in words per minute) from the indication of the timer.

The self-correction described, it will be seen, is obtained irrespective of whether the unpaced, timed, test is conducted by fixed-interval timing with an audible signal or with a timer operation analogous to that of a stop-watch. So long as the percentage speed error remains constant between paced reading and timing operations, correction is perfect. Since, by the nature of the use of the machine, these operations are desirably performed at a single practice session, the effects of variations in manufacture, calibration drifts due to aging of a spring mechanism, etc., are negligible, particularly in the case of mechanisms wherein the proportionality of calibrated speed values is relatively independent of absolute accuracy, as in the case of spring-driven mechanisms. In the case of certain mechanisms such as battery-driven motors, the device of the invention is preferably constructed in a manner producing a minimum of change of current load on the battery in the two modes of operation of the motor, since the speed error caused by battery aging is in general not otherwise the same in the two operations.

The discussion above relates to a form of construction conceptually easiest to understand, i.e., with a motive mechanism selectively connected to drive either a line-indicator or a timing indicator. In achieving such advantages in a simpler manner in accordance with the invention, however, the selective connection is eliminated, and the moving portion of the assembly which serves for line indication is also employed for the timer indication, either audible (in preset time use) or visual.

It will be seen that the actual reading speeds shown by the unpaced timed tests will be subject to the error of calibration which is automatically corrected or compensated as regards setting the machine for further practice, but nevertheless leaves the user under a misimpression as to absolute speed. The unimportance of this misimpression becomes apparent when viewed in the overall use of the method involved. A "course" or program involves a large number of speed increases at increments of ten to fifteen percent, and produces increase of reading speed by a substantial multiple, irrespective of the unpaced speed of reading which the user has at the commencement of such practice, i.e., before ever having the eye-training here involved. An error of even a substantial fraction in absolute reading rate may properly be considered negligible from the standpoint of informational importance as regards progress and improvement, since an individual's absolute reading rate may well vary by a considerable amount during the course of a day in any event, and the object of the timing method does not in general concern itself with such minor variations. Where the error in absolute measurement is nevertheless considered as sufficiently important to require its being eliminated, the reading speeds as paced and as measured without pacing may be in the form of arbitrary (or unexplained) numbers, in accordance with another aspect of the invention, so that the entire repeated cycling of practice, testing, and practice at advanced speed may be self-administered without ever introducing absolute speeds (in words per minute or similar terms).

The elimination of discrepancies between the reading rates as paced and as timed unpaced (whether in words per minute or in arbitrary "number" units) permits the use of novel direct-reading test materials eliminating all necessity of calculation or other similar operations in determining proper paced settings for succeeding practice. The complete interlocking of pacing and timing operations can be utilized for direct automatic indication of the next speed to be used for practice. Where a fixed interval is used, with an audible signal, marginal indications on the test reading materials can be employed to directly indicate the next speed (actual or arbitrary number) at which practice should occur, simply by observing the marginal indication opposite the line reached upon the giving of the audible signal. Or, where the printed length of the material is the constant, and the reading time is measured, the timer may be calibrated or read directly in terms of the next speed-setting to be used, either in addition to or in substitution for the reading of the elapsed time. This aspect of the invention accordingly provides a set comprising the machine as previously described, provided with calibration markings on the speed control for the line-indicator, and test material for unpaced reading, the line-indicator comprising a portion of the timer used in the tests, test-reading periods being initiated by commencement of the downward stroke of the line-indicator and terminated at the end of a fixed length of the test reading material or a fixed progression of the line-indicator; in the former case the reading-speed indication markings are desirably on the machine along the path of the shutter, while in the latter case they are desirably in the margin of the reading material.

Although the broader teachings of the invention may readily be applied from the description of the general principles above, the invention also affords particular constructional features and advantages best understood from the description of the particular embodiments of the invention illustrated in the drawing and described below.

In the drawing:

FIGURE 4 is an enlarged elevational view of a timing indicator mechanism constituting a portion of the device in its standby or unactuated position;

FIGURE 5 is a view similar to FIGURE 4 but with the mechanism in its actuated or cocked position;

FIGURE 6 is a sectional view taken along the line 6—6 of FIGURE 4;

FIGURE 7 is a more or less schematic top plan view of a device constituting a second embodiment of the invention;

FIGURE 8 is a highly schematic diagram of certain basic internal construction features of the embodiment shown in FIGURE 7.

Figure 1:
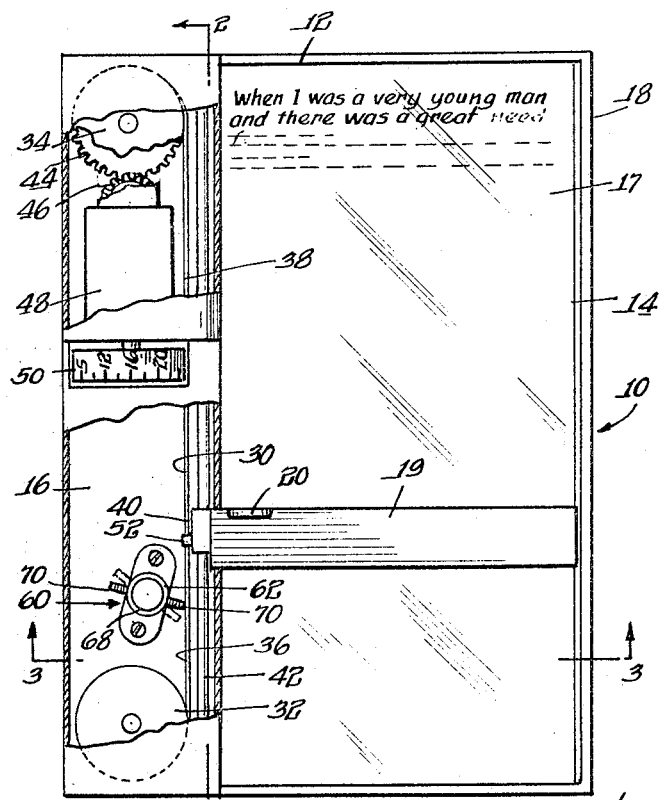
FIGURE 1 is a top plan view, with the housing partially broken away in section, of a reading-training pacing and timing device employing the invention.
Figure 2:
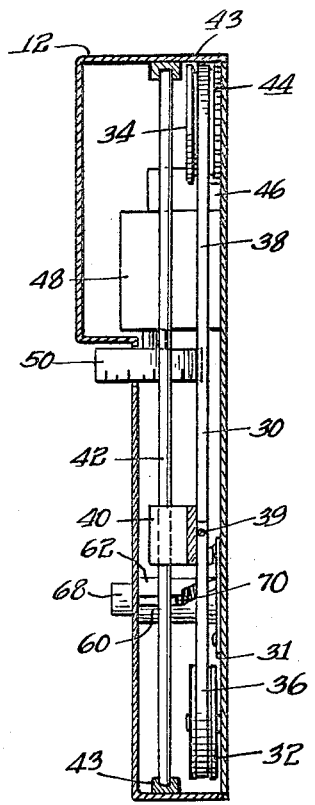
FIGURE 2 is a longitudinal sectional view taken along the line 2—2 of FIGURE 1.
Figure 3:
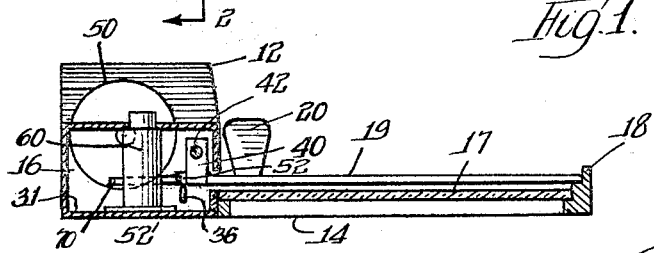
FIGURE 3 is a transverse sectional view taken along the line 3—3 of FIGURE 1.

In FIGURES 1 through 6, the invention is shown as applied to a reading-training device 10 which is illustrated and described in U.S. Patent 2,919,500, and is accordingly illustrated in the present drawing in more or less simplified form, for simplicity of description and illustration of the portions there more fully described. The device and its housing 12 may generally be considered as divided into two portions, a viewing portion 14 and a mechanism portion 16. The viewing portion has a window 17 bounded at the top, bottom and right side by a frame 18. Extending across this window is a shutter member 19 having vertically extending tab 20 for manual manipulation.

A pre-stressed ribbon tape or spring 30 extends parallel to floor 31 of the mechanism section between a lower spool 32 and an upper spool 34. The composite spring includes two separate sections, of which the section 36 about and adjacent the lower spool 32 is of greater force than the upper section 38 to impart a downward motion in the manner described in the mentioned patent. Affixed to spring 30 at the junction of the two sections, by suitable attachment illustrated as a rivet 39, is a slider 40 which is mounted for movement on a longitudinal guide rod 42. This guide rod extends along the side of mechanism portion 16 and is shown as mounted in sockets 43. Permanently secured to the slider 40 for movement therewith is the pacer member or shutter 19.

The upper spool 34 has mounted thereon a suitable gear wheel 44 which meshes with a conventional gear train 46 for coupling to the speed control mechanism 48, such as an eddy-current device, having a calibrated speed-selecting knob 50 for varying the speed of the line-indicating member 19. The knob is rotatable and on rotation varies the setting of the speed control mechanism 48 accordingly.

Combined with the general construction as set out thus far, which is described in greater detail in the earlier patent mentioned above, is a timer for use in unpaced reading. (The term "unpaced reading" as herein used refers, as is conventional, to reading of materials located separate and apart from the machine so that the moving portion does not fix or guide the speed of reading.) The slider 40 bears a horizontally extending finger 52 subtending a path parallel to the longitudinal guide rod 42 and serving to trip an audible elapsed time indicator 60, shown in FIGURES 4 through 6 inclusive. This indicator 60 includes an outer vertical tubular body 62 which is mounted on floor 31 of the housing portion 16. On opposed sides of tubular body 62 are vertically extending slots 64 which terminate at their lower ends in latching regions 66 to be further described. A hollow cylinder 68 is slidable vertically within the tubular body 62 and bears at its lower end diametrically opposed horizontal arms 70 fitting the opposed slots 64 with suitable clearance to allow vertical sliding motion of the arms within the slots. A top 72 on the cylinder forms a thumb-button enclosing a compression spring 76 bearing against floor 31. Upward movement of the cylinder is limited by means of an annular snap-ring 78 which fits in a suitable groove 80 in the outer surface of tubular body 62, thus effectively limiting motion of the horizontally extending arms 70 to the lower or latching regions 66 of the slots.

When cylinder 68 is depressed by the thumb of the user, arms 70 ride downwardly in slots 64 and are deflected toward latching regions 66 by the curvature of cam portions 81, thus rotating the arms to a position where, upon release by the user, they are engaged by shoulders 82 formed at the top of the latching regions 66, and the thumb-button is thus latched in the depressed position shown in FIGURE 5. One of the arms 70 has its outer end in the path of the finger 52, which thus unlatches the thumb-button to produce an audible signal by the upward "snap" occurring when the rotation of the button releases it from the shoulders.

To utilize the entire device as a timing mechanism, it is first necessary to set the selecting knob 50 at a predetermined setting, such as a standard setting indicated on the knob as "S" in the drawing. The pacer member 19 is then manually moved to its uppermost or start position and time indicator 60 is actuated by depressing the cylinder or thumb-button 68.

With the predetermined speed of travel having been set for the pacer member (subject to any calibration error), the pacer member traverses the distance between its start position and the tripping of time indicator 60 in a predetermined length of time such as three minutes, at the end of which there is produced a readily audible "click." Optionally, a bell or the like (not illustrated) may be positioned to be struck by the indicator arm 70 as it snaps back to the upper position.

Figure 9:
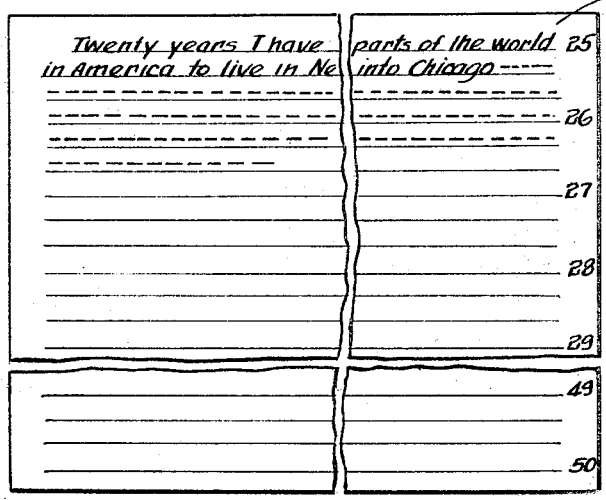
FIGURE 9 is a plan view of reading material which is combined with the pacing device of FIGURE 1 in a combined testing and pacing set.

There is shown in FIGURE 9 a sample of test reading material 99 constituting a member of a set of equipment including the machine. At the right side margin adjacent the lines of type are indicia serving as indication of unpaced reading speed, for use as the basis for setting the pacing speed of the machine described above. In the form shown, these indicia are numbers bearing no simple relation to the number of words read, but being "speed numbers" corresponding to a similar set of numbers on the dial or knob 50 employed for speed control. Successive numbers may represent line-indicator speeds increasing geometrically at an increase rate of, for example, twelve percent. In addition to these numbered speeds the dial or knob 50 has the "standard speed" position previously mentioned. The speed numbers are in the margin of the test material 99 at successive places such that when the standard timing interval (the time for progression of the shutter from the top of its stroke to triggering of the audible indicator, at the "standard speed") is used in reading the test material from its beginning, the marginal indication in the region reached is an indication of the speed number producing the corresponding rate (or, alternatively, the next higher rate, if this is preferred) in paced reading. In less arbitrary forms of marking than "speed numbers," the marginal indicia and the speed control knob may be calibrated in terms of actual numbers of words read, either per unit time (words per minute), or in the standard time (normally three minutes or so). Preferably, the numbers on the speed control and in the marginal test-speed indicia are the same; however, if desired, the marginal indicia on the test material may be simply "word counts," and the speed control may be calibrated in words per minute, the marginal indications being divided by the nominal period of the standard timing interval to produce the corresponding speed control marking.

It will be seen that many other variations of the markings on the speed control of the machine and test material portions of the set may be used, such as inches per minute, etc. However all of these have in common the correspondence between the marginal indication on the test materials and the speed markings on the line-indicator control, these being preferably correlated by complete identity, but minimally by a correspondence of a simple nature such as one set being a mere multiple of the other, particularly a multiple corresponding numerically to the standard timing interval. Irrespective of the indicia employed, however, all errors of either absolute value of the timing interval or calibration of the speed markings used in the spaced reading are mutually self-cancelled so long as the deviations from nominal values remain proportional, as is the case, in general, particularly with the type of drive mechanism here shown.

It will of course be understood that a complete reading-training set includes many tests and practice materials. Usually, the type size and format of the practice materials corresponds to that of the test materials, in order to eliminate extraneous factors from upsetting the relation between paced and unpaced reading speeds. It will be seen upon study, however, that this identity is not necessary to the present system, the marginal indications of control settings on the test materials being capable of indicating corresponding speeds with other formats than the test material itself. Also, as will be obvious from study, the error-correction inherent in the use of the same motive mechanism for the paced reading and the timing of the unpaced reading may be obtained without the use of special markings or indicia on the test materials, as where word counts, etc., are actually made on reading material not specifically prepared for test purposes.

Now turning to the embodiment of the invention shown in FIGURES 7 and 8, there is shown a reading-training device 100 generally similar to overall operation to the one previously described, but incorporating an elapsed-time measurement instead of a fixed internal-timer. This form of the invention is here shown as applied to a prior art pacing device of slightly different constructional features as regards drive mechanism and similar details. In this very inexpensive construction, the entire housing 102 contains the drive mechanism, and the line-indicator 104 extends at one side to form the reading area 106. The use of the line-indicator 104 in paced reading is the same as previously described. The line-indicator 104 again has a vertical grasping tab 107 which here serves a second purpose as a timing indicator, as will be later described.

This embodiment utilizes a battery-driven motor 108 and a small set of batteries 109. The details of the drive may be of any well-known construction, and are accordingly illustrated only in the highly schematic form of FIGURE 8. The motor output is connected in a conventional manner to a drive 111 (such as a worm) transmitted suitably by coupling 113 to the line indicator 104. The drive speed is controlled through a speed regulating control mechanism 112 bearing a selecting knob 110. Persons skilled in the art will readily recognize the completely diagrammatic nature of the showing of the drawing, particularly as regards the coupling of the control 112 to the mechanism 111; although such a mechanical control can be employed, the most inexpensive form of speed control would obviously employ a rheostat in series with the motor and battery and the "On-Off" switch shown at 114.

As shown in FIGURE 7, knob 110 is calibrated with a set of numbers from 150 to 1200 in the particular illustration, representing shutter speeds in words per minute. For timing of unpaced reading, there is provided again a setting "S." (It will be understood that where rheostat speed control is used, this speed setting of the control knob may be replaced by an auxiliary "Timer-Pacer" switch substituting a fixed resistor for the rheostat.)

A calibrated scale 115 extends along the housing next to the path of the line indicator. The scale is calibrated in elapsed time, so that the device becomes a simple form of timer when the "standard" speed is used. This scale (only a portion of whose markings is shown) may be used for the timing of the unpaced reading of any type of material, and the reading rate found by dividing the word count of the material by the elapsed time. Additionally, direct calibration in terms of reading speed is provided for use with fixed-length test materials, this length being 1200 words in the illustrated example. The scale 115, or any portion thereof, may of course be made replaceable for use wih materials of different lengths.

As will be observed from the drawing, the timing operation is initiated with the shutter at the "Start" or upper position. The switch 114 is turned "On" simultaneously with the commencement of reading and "Off" upon completion. Upon reading (or calculation) of the rate at which satisfactory comprehension was obtained (normally established by comprehension tests also included in such sets), the new practice rate may be set. Again, the inaccuracy of the various markings due to manufacturing tolerances, battery life, etc., tends to be self-cancelling in the overall operation of measuring unpaced rate and then setting for practice.

It will be observed that in both of the illustrated embodiments, the "standard" or "timing" speed of the shutter is very low, slower than the lowest pacing rates. This is desirable in order that even a very slow reader can be timed in unpaced reading of a number of pages if desired. For all reading speeds normally encountered, a single standard timing speed is found to be adequate. However, where machines are designed for use over an abnormal range of reading speeds, it may be desirable to incorporate provision for a fast and slow timer operation, which may be done by simply adding another standard timer marking, with suitable provision for preventing confusion of readings, etc. For example, in the case of the fixed interval timer, although a three-minute timing interval is normal, it may be inadequate for remedial-type work with children, or excessive in certain types of development of "fast scan" ability by highly accomplished readers. Likewise, in the case of the fixed-length test, extreme abnormal conditions of of a single timer speed might make the maximum time capacity inadequate, on the one hand, or produce too small a progression of the indicator to permit accurate reading, on the other.

It will be observed that in both the illustrated embodiments the line-indicator assembly performs the timing function; thus the only revision of a pacing device required for performance of the timing function is the addition to the audible or visible tuning indicator or indicia. These are added in such a manner that there is no intererence with the operation of the machine in its pacing function. In the case of the audible signal, the construction illustrated, wherein the timer is actuated by manually placing the actuator or trip member in the path of the shutter assembly, whence it is removed upon tripping by the motion which produces the audible signal, automatically restores in full the pacing-device condition, thus requiring no further manipulation of a clutch, etc. In both the embodiments illustrated, the elimination of the separate timer heretofore universally employed with such pacing devices thus not only greatly reduces the cost of the overall equipment both by the saving of parts and the lowering of required precision of manufacture without any sacrifice of accuracy and efficiency of use for the intended purpose or of convenience of use, but indeed with a substantial gain in the latter factors.

A large number of further modifications of the invention will be found by persons skilled in the art. Many of these will be immediately obvious, while others will be seen only after study. The basic features of the constructions illustrated and described may readily be adapted to structures far different in appearance and details than herein shown, while still embodying the advantageous teachings of the invention. Accordingly the scope of the protection to be given the invention should not be determined by the particular embodiments herein illustrated and described, but should extend to all use of the novel features described in the appended claims, and equivalents thereof.

What is claimed is:
1. A reading-training device comprising:
   (a) a drive mechanism operable at a plurality of speeds,
   (b) a line-indicating assembly driven by the drive mechanism,
   (c) and an audible indicator assembly having an actuator manually settable in the path of the line-indicating assembly,
   (d) and means responsive to the striking of the actuator by the line-indicating assembly to produce the audible indication and withdraw the actuator from the path of the line-indicating assembly.
2. A reading-training device comprising:
   (a) a line-indicating assembly including a line-indicating member movable over a fixed path to pace reading,
   (b) means for driving the line-indicating assembly at manually variable constant speeds including calibrated speed-adjustment means,
   (c) and an audible signalling assembly adjacent to the path of the line-indicating assembly and having a manually set latched spring mechanism and an extending actuator member manually positionable in the path of the line-indicating assembly to sound the signal upon the reaching by the latter assembly of a fixed point in its path.
3. A reading-training set comprising the combination of the device of claim 2 with test reading material having successive marginal indications of reading speed during an interval timed by the production of the audible indication at one predetermined speed of the drive mechanism.
4. The reading-training set of claim 3 wherein the speed-adjustment means is calibrated in arbitrary progressive indicia and the marginal indications on the test reading material are corresponding indicia.
5. The reading-training set of claim 3 wherein the marginal indications are indicia corresponding to the calibration of the speed-adjustment means.
6. The device of claim 2 wherin the driving means comprises a spring exerting a force at least partially determining the speed.

References Cited by the Examiner
UNITED STATES PATENTS

| | | | |
|---|---|---|---|
| 2,765,543 | 10/1956 | Crowell et al. | 35—35.2 |
| 2,919,500 | 1/1960 | Simpson et al. | 35—35.2 |
| 3,054,195 | 9/1962 | Palmer | 35—9 |
| 3,126,648 | 3/1964 | Strong et al. | 35—35.2 |

JEROME SCHNALL, *Primary Examiner.*
LAWRENCE CHARLES, EUGENE R. CAPOZIO,
*Examiners.*
WILLIAM GRIEB, *Assistant Examiner.*